US010789003B1

(12) United States Patent
Sun et al.

(10) Patent No.: US 10,789,003 B1
(45) Date of Patent: Sep. 29, 2020

(54) SELECTIVE DEDUPLICATION BASED ON DATA STORAGE DEVICE CONTROLLER STATUS AND MEDIA CHARACTERISTICS

(71) Applicant: Western Digital Technologies, Inc., San Jose, CA (US)

(72) Inventors: Chao Sun, San Jose, CA (US); Qingbo Wang, San Jose, CA (US); Dejan Vucinic, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/367,900

(22) Filed: Mar. 28, 2019

(51) Int. Cl.
  *G06F 3/06* (2006.01)
  *G06F 12/1009* (2016.01)

(52) U.S. Cl.
  CPC .......... *G06F 3/0641* (2013.01); *G06F 3/0608* (2013.01); *G06F 3/0659* (2013.01); *G06F 3/0673* (2013.01); *G06F 12/1009* (2013.01); *G06F 2212/657* (2013.01)

(58) Field of Classification Search
  CPC .... G06F 3/0641; G06F 3/0673; G06F 3/0659; G06F 3/0608; G06F 12/1009; G06F 2212/657
  See application file for complete search history.

(56) References Cited

U.S. PATENT DOCUMENTS

| 8,825,617 | B2 | 9/2014 | Haas et al. | |
|---|---|---|---|---|
| 9,348,538 | B2 | 5/2016 | Mallaiah et al. | |
| 9,612,953 | B1* | 4/2017 | Davis | G06F 3/0679 |
| 9,733,836 | B1* | 8/2017 | Garg | G06F 3/0631 |
| 2011/0125950 | A1* | 5/2011 | Haustein | G06F 3/0608 711/4 |
| 2011/0184908 | A1* | 7/2011 | Slater | G06F 3/0608 707/609 |
| 2013/0018853 | A1* | 1/2013 | Jayaraman | G06F 3/0608 707/692 |

(Continued)

FOREIGN PATENT DOCUMENTS

| CN | 102156727 | 8/2011 |
|---|---|---|
| CN | 105930101 | 5/2016 |

OTHER PUBLICATIONS

Wang et al., "NV-Dedup: High-Performance Inline Deduplication for Non-volatile Memory", IEEE Transactions on Computers, vol. 67, Issue 5, May 1, 2018, pp. 658-671.

(Continued)

*Primary Examiner* — Hiep T Nguyen
(74) *Attorney, Agent, or Firm* — Womble Bond Dickinson (US) LLP; Tony T. Chen (57) ABSTRACT

Systems and methods are disclosed for determining whether data to be written to a memory should be deduplicated. In some implementations, a method is provided. The method includes determining whether data to be written to a memory should be deduplicated based, at least in part, on status information of a controller and media characteristics of the memory, wherein the status information of the controller indicates a level of resources available for a deduplication operation. In response to determining that the data should be deduplicated, determining whether the data is duplicative based on the type of memory the data is being written to.

20 Claims, 7 Drawing Sheets

(56) References Cited

U.S. PATENT DOCUMENTS

| | | | |
|---|---|---|---|
| 2014/0114932 A1* | 4/2014 | Mallaiah | G06F 3/067 |
| | | | 707/692 |
| 2014/0244598 A1* | 8/2014 | Haustein | H04L 63/123 |
| | | | 707/692 |
| 2017/0031830 A1* | 2/2017 | Bk | G06F 3/0656 |
| 2017/0286444 A1* | 10/2017 | Chambliss | G06F 16/282 |
| 2018/0060367 A1 | 3/2018 | Ioannou et al. | |
| 2018/0253255 A1* | 9/2018 | Jain | G06F 16/13 |

OTHER PUBLICATIONS

Chen et al., "NF-Dedupe: A Novel No-fingerprint Deduplication Scheme for Flash-based SSDs", 20th IEEE Symposium on Computers and Communication (ISCC), 2015, pp. 588-594.

* cited by examiner

| 151A | 151B | 151C | 151D | 151E | 151F | |
|---|---|---|---|---|---|---|
| Tag-TX_ID | Reference Count | Chunk Number | Fingerprint (Strong) | Fingerprint (Weak) | Strong Fin. Flag | Padding |
| 0x10 | 1001 | 1 | 1001 | - | 0xE3..27 | 0 | |
| 0x80 | 2016 | 1 | 1002 | 0x1E0878..26 | 0x35..45 | 1 | |
| 0x40 | 3721 | 3 | 1003 | 0x224E5C...33 | 0xE2..71 | 1 | |
| ... | ... | ... | ... | ... | ... | |
| 0x20 | 1275 | 3 | 7890 | - | 0x12..73 | 1 | |
| 8B | 8B | 8B | 32B | 4B | 1B | 3B |

SELECTIVE DEDUPLICATION BASED ON DATA STORAGE DEVICE CONTROLLER STATUS AND MEDIA CHARACTERISTICS

BACKGROUND

Field of the Disclosure

This disclosure relates to data storage devices. More particularly, the disclosure relates to deduplication of content written to and/or stored on data storage devices.

Description of the Related Art

Data storage devices may be used to store data used by computing devices. For example, a computing device may read or access data that is stored on the data storage device (e.g., read a file or other data object). In another example, a computing device may write data to or store data on a data storage device. When writing to the memory of a data storage device, a storage controller may perform deduplication to avoid writing/storing redundant data within the data storage device.

SUMMARY

In some implementations, the present disclosure relates to an apparatus including a memory and a controller. The controller is configured to determine whether data to be written to the memory should be deduplicated based, at least in part, on status information of the controller and media characteristics of the memory. The status information of the controller may indicate a level of resources available for a deduplication operation. In response to determining that the data should be deduplicated, the controller may determine whether the data is duplicative.

In some implementations, the present disclosure relates to an apparatus having a memory and a controller. The memory may include a first memory having an access time for a chunk (or other unit) of data that may be greater than the time required to calculate a fingerprint for the same chunk of data and a second memory having an access time for a chunk. (or other unit) of data that may be less than the time required to calculate a fingerprint for the same chunk of data. The controller is configured to determine whether data to be written to the memory should be deduplicated based, at least in part, on status information of the controller and media characteristics of the memory. The status information of the controller indicates a level of resources available for a deduplication operation. In response to determining that the data should be deduplicated, the controller may determine whether the data is duplicative based on whether the data to be written to the memory is to be written to the first memory or the second memory.

In some implementations, the present disclosure relates to a method. The method includes determining whether data to be written to a memory should be deduplicated based, at least in part, on status information of a controller and media characteristics of the memory, wherein the status information of the controller indicates a level of resources available for a deduplication operation. The method further includes determining whether the data is duplicative in response to determining that the data should be deduplicated.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to storing neural networks and weights for neural networks.

Data storage devices, such as solid state drives (SSDs) typically include one or more controllers coupled with one or more non-volatile memory (NVM) arrays. Data stored on such memory arrays may be subject to loss and/or corruption. For example, data may be lost, damaged, corrupted, etc., due to failure of memory cells, damage (e.g., physical damage), degradation, read/write disturbs, loss of data retention, loss of endurance, etc. However, data written by applications, also known as the primary data, may have a higher duplication ratio (the percentage of duplicate data in all data). For example, an application may write a series of images, one or more of which are already stored in the NVM array. Alternatively, a word processing application may attempt to save a document that is a duplicate of a document already stored in the NVM array. Removal of duplicate data significantly promotes space efficiency of NVM arrays and results in fewer write operations. Fewer write operations also benefits the lifetime of NVM arrays considering some. NVM's write endurance issues as a result of repeated write operations etc. Deduplication is an effective method used to reduce the write traffic of applications and can extend the lifespan of data storage devices such as SSDs. Deduplication, in one example, calculates a fingerprint for a data chunk using a cryptographic hash function, like MD5, SHA-1 or SHA-256, and searches for a matching fingerprint in an existing fingerprints database (or metadata table) to determine whether the chunk is a duplicate of a chunk already stored in memory or not. Duplicate data may not be written/stored. The deduplication granularity can be a file, a chunk, a block, a page, a sector, a line, a word line, or some other appropriate unit of data, and the size of a chunk can be fixed or variable. Specific chunking methods may be used to identify the boundary between chunks.

Although deduplication may be used to prevent writing redundant data (thereby extending the lifespan of a data storage device such as an SSD), it is more effective when the time saved avoiding writing duplicate data is more than the time used for identifying and managing duplicate data. Factors such as the level of resource contention among operations executing on the controller (e.g., pre-fetching, data buffering and deduplication) can impact the amount of time a deduplication operation requires. For example, high levels of resource contention can correspond to a large amount of time required to identify and manage duplicate data. Embodiments of the present disclosure describes a method and apparatus for determining when deduplication is appropriate based on status information of the controller as well as media characteristics of the non-volatile memory.

Figure 1A:
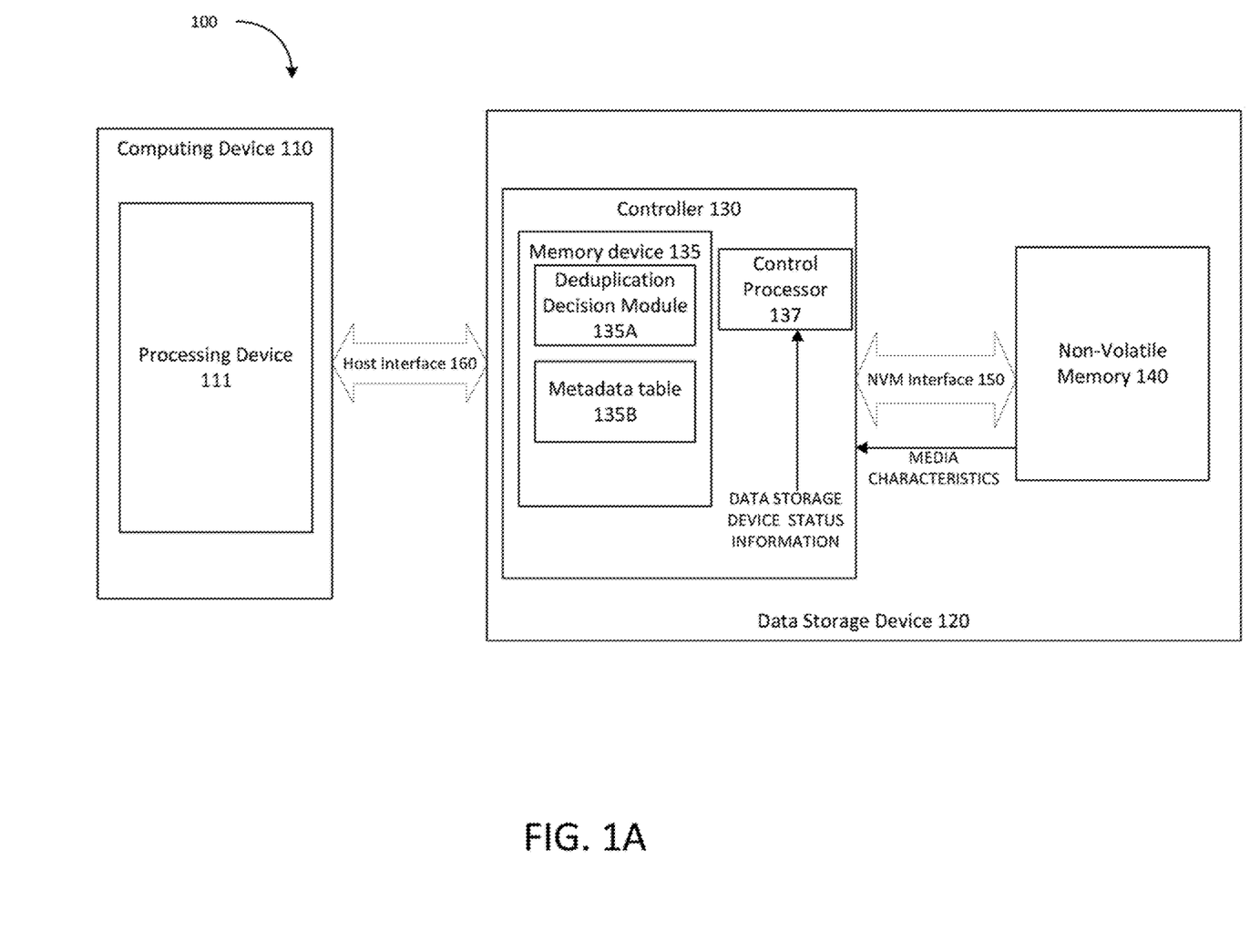
FIG. 1A is a block diagram illustrating an example data storage system, in accordance with one or more embodiments of the present disclosure.

FIG. 1A is a diagram illustrating an example data storage system 100, in accordance with some embodiments of the present disclosure. The data storage system 100 includes a computing device 110 and a data storage device 120. The computing device 110 may also be referred to as a host system. In one embodiment, the data storage device 120 may be part of the computing device 110 (e.g., may be located inside of a housing, chassis, ease, etc., of the computing device 110). In another example, the data storage device 120 may be separate from the computing device 110 (e.g., may be an external device that is coupled to the computing device 110 via a cable, such as a universal serial bus (USB) cable).

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, any storage device utilizing solid-state memory, a hard disk drive, any storage device utilizing magnetic media/medium, etc.) includes a controller 130 (e.g., control circuitry, software, firmware, or a combination thereof) and a non-volatile memory 140.

The non-volatile memory (NVM) 140 may be configured far long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM, PCM, or PRAM), Programmable Metallization Cell RAM (PMC-RAM or PMCm), Ovonic Unified Memory (OUM), Resistance RAM (RRAM) NAND memory (e.g., single-level coil (SLC) memory, multi-level cell (MLC) memory, triple level cell (TLC) memory, X4 or quad-level cell (QLC) memory, etc.), NOR memory, EEPROM, Ferroelectric Memory (Fe-RAM), magnetoresistive RAM (MRAM), or other discrete solid-state memory chips. In some embodiments, non-volatile memory 140 may comprise NAND flash memory having a certain access time for a unit of data, while in other embodiments non-volatile memory 140 may comprise fast NAND flash or storage class memory (SCM A.k.A. persistent memory), which has a faster access time for a unit of data than NAND flash memory. In other embodiments, non-volatile memory may be a hybrid memory comprising both NAND flash memory and fast NAND flash or SCM. The non-volatile memory 140 may include any combination of the one or more types of memories described here. The non-volatile memory 140 may be divided logically and/or physically into arrays, planes, blocks, pages, tracks, and sectors. If the data storage device 120 is a hard disk drive, the non-volatile memory 140 may include magnetic recording heads coupled with rotating magnetic media.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive data commands from a storage interface (e.g., a device driver) residing on the computing device 110.

The controller 130 may comprise a control processor 137, memory device 135. Memory device 135 may comprise a controller read-only memory and/or a controller volatile memory (e.g., DRAM).

Figure 2:
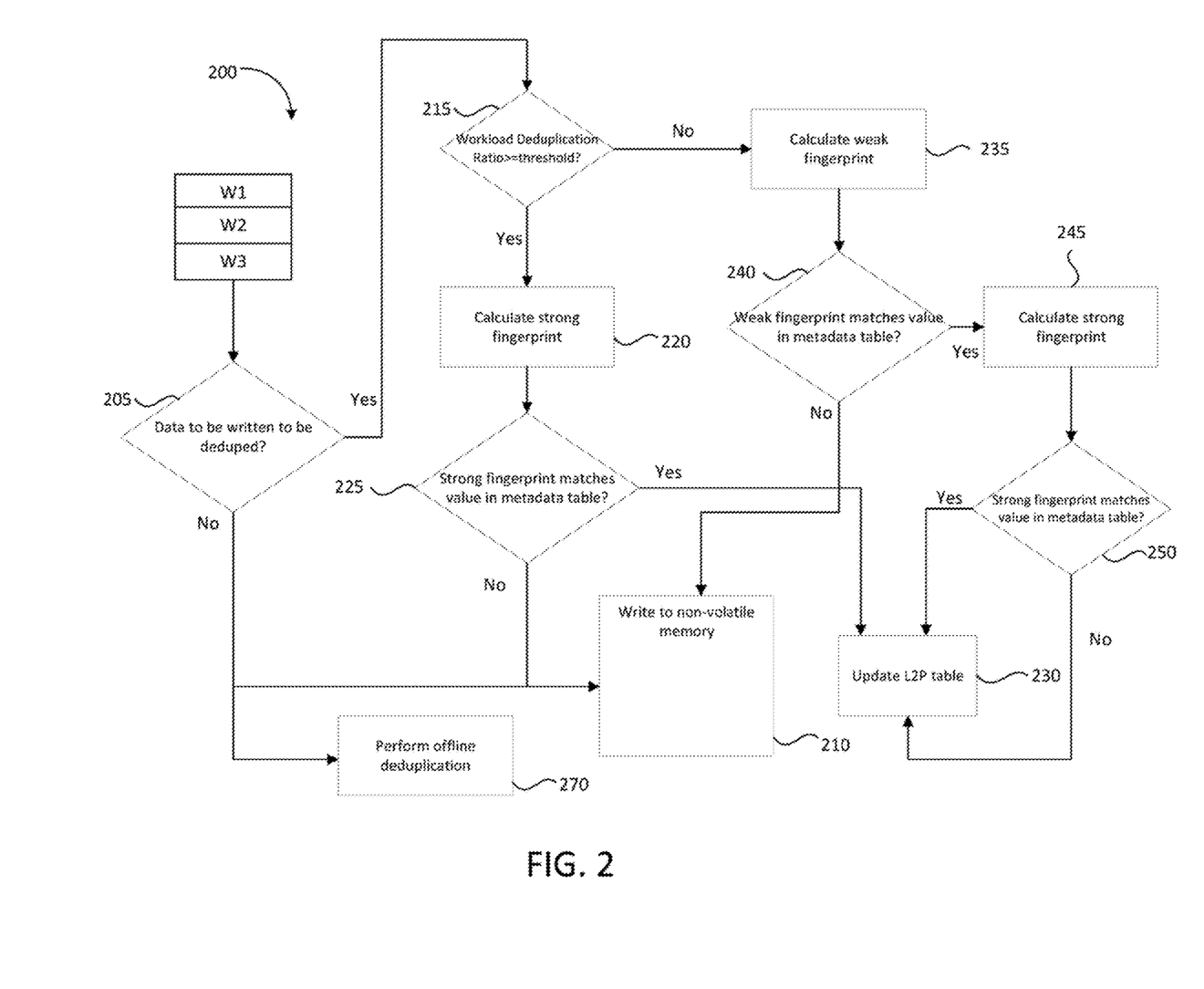
FIG. 2 is a flowchart illustrating an example process for deduplicating data, in accordance with one or more embodiments of the present disclosure.
Figure 3:
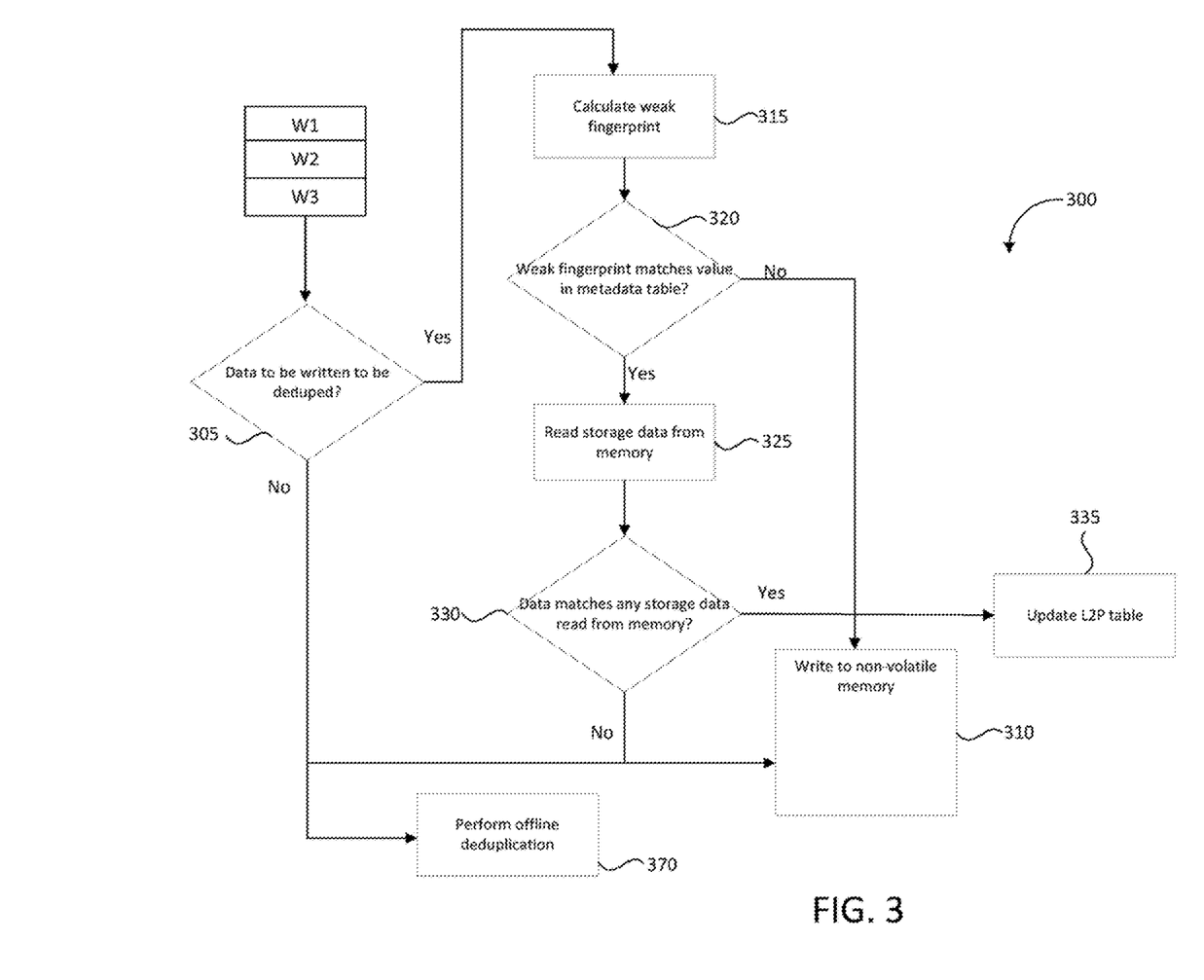
FIG. 3 is a flowchart illustrating an example process for deduplicating data, in accordance with one or more embodiments of the present disclosure.
Figure 4:
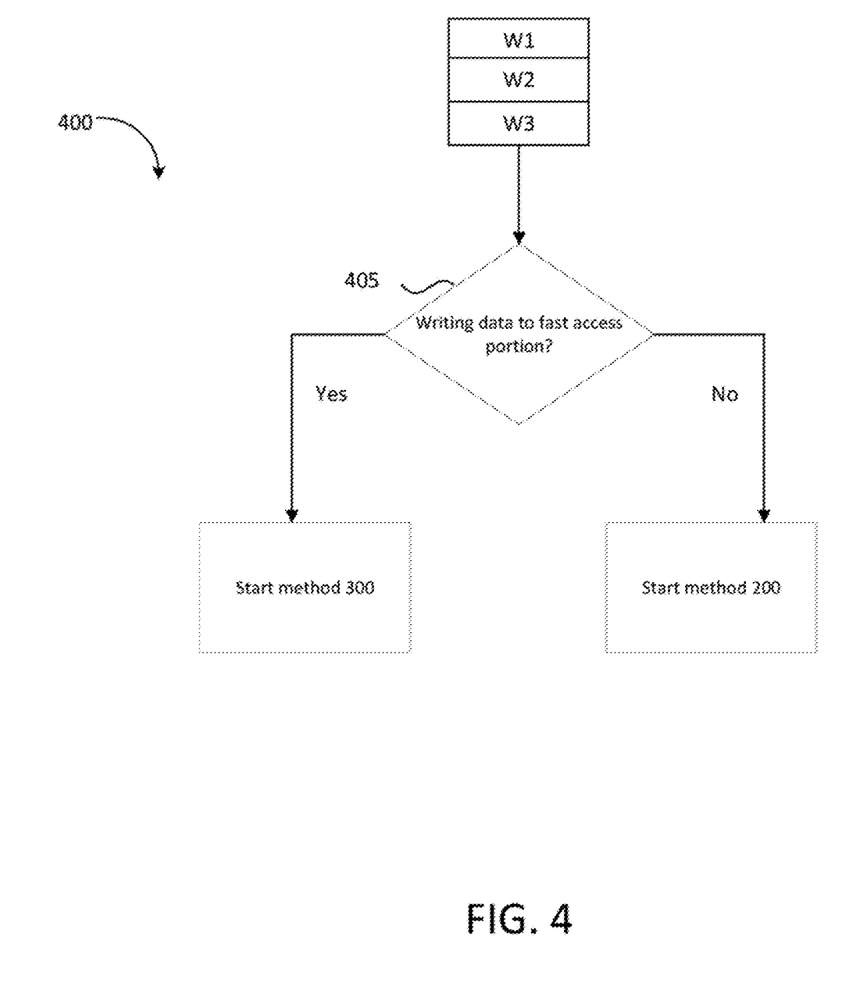
FIG. 4 is a flow diagram illustrating an example process for deduplicating data to be written to hybrid memory, in accordance with one or more embodiments of the present disclosure.

The memory device 135 of the controller 130 may include or otherwise be configured to store execution code of deduplication module 135A, which may comprise code such as a set of instructions that configure the control processor 137 to provide aspects of the functionality described herein with respect to FIGS. 2, 3 and 4 for example. Alternatively or additionally, the control processor 137 can access code from the non-volatile memory 140, such as a reserved area of memory cells in one or more word lines. As discussed in more detail herein, deduplication module 135A may allow controller 130 to determine whether data to be written to non-volatile memory 140 should be deduplicated based on status information of controller 130 as well as media characteristics of non-volatile memory 140. Deduplication module 135SA may utilize a machine learning algorithm trained on controller status information and media characteristics training data to determine whether data to be written should be deduplicated based on status information of controller 130 and the media characteristics of non-volatile memory 140.

Memory device 135 may also include or otherwise be configured to store a metadata table 135B having strong and weak fingerprints for chunks of data that have been written to non-volatile memory 140. As discussed in further detail herein, a strong fingerprint value may be calculated for a chunk of data by applying an appropriate strong finger printing algorithm to it, such as a SHA-1 or SHA-256. A strong fingerprint value may be one that generates a larger fingerprint value (for example, 160 bits or more) and thus involves a large computational overhead (i.e. more storage requirements and processor usage) and longer processing time. For example, calculating a strong fingerprint on a 4 KB data chunk using the SHA-1 algorithm may require 47548 processor cycles (using a 300 MHz processor) and the processing time may range from 80 microseconds to 6212 microseconds depending on the processor used. However, the probability of an accurate match with a strong fingerprint value may be higher (for example, 97% accuracy or better). A weak fingerprint value may be calculated for a chunk of data by applying an appropriate weak fingerprinting algorithm to it, such as CRC32 or Fletcher 32. A weak fingerprinting algorithm may be one that generates smaller fingerprint value (for example, 32 bits or less) and thus involves a small computational overhead i.e. less storage requirements and processor usage) and shorter processing time. For example, calculating a weak fingerprint on a 4 KB data chunk using the CRC32 algorithm may require 4120 processor cycles (using a 300 MHz processor) and the processing time may range from 10 microseconds to 100 microseconds depending on the processor used. However, the probability of an accurate match with a weak fingerprint value may be lower (for example, 75% accuracy or better) than the probability of an accurate match when a strong fingerprinting algorithm is used. In some embodiments, metadata table 135B could be implemented or stored in non-volatile memory 140.

The controller 130 may communicate with the computing device 110 over a host interface 160, and may receive commands via the host interface 160. These commands may be referred to as data commands, data access commands, data storage access commands, etc. Data commands may specify a block address in the data storage device 120. Data may be accessed/transferred based on such data commands. For example, the controller 130 may receive dam commands (from the computing device 110) and may execute such commands on/in the non-volatile memory 140 (e.g., in one or more arrays, pages, blocks, sectors, etc.). The data commands received from computing device 110 may include read data commands, write data commands, and erase data commands. The controller 130 may be coupled to the non-volatile memory (MINI) 140 via a NVM interface 150. In one embodiment, the NVM interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received data commands to read, write, and erase data from non-volatile memory 140, via the NVM interface 150. For example, the commands may include a read command (e.g. a data read command) to read a block of data from the non-volatile memory 140. The controller 130 may read the data from the page and may transmit the data to the computing device 110 via the host interface 160. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 110 via the host interface 160 and may write the data to the page. The host interface 160 may include hardware wires, pins, traces, connectors, etc.), software (e.g., drivers), firmware, or a combination thereof, that allows the processing device 111 and/or the computing device 110 to communicate data with the data storage device 120. Examples of a host interface may include a peripheral component interconnect express (PCIe) bus, a serial AT attachment (SATA) bus, a serial attached SCSI (SAS), a non-volatile memory express (NVMe) bus, etc.

The data storage device 120 may store data received from the computing device 110 such that the data storage device 120 acts as data storage for the computing device 110. To facilitate this function, the controller 130 may implement a logical interface. The logical interface, may present to the computing device memory a set of logical addresses (e.g., sequential/contiguous addresses) where data may be stored. Internally, the controller 130 may map logical addresses to various physical memory addresses in the non-volatile memory arrays and/or other memory module(s) using a logical to physical mapping table. Mapping data indicating the mapping of logical addresses to physical memory addresses may be maintained in the data storage device. For example, mapping table data may be stored in non-volatile memory 140 in order to allow for recreation or recovery of mapping tables following a power cycle.

The controller 130 may encode data when storing the data on the non volatile memory 140. The controller 130 may encode the data to protect the data from errors, loss, corruption, etc. The controller 130 may protect the data from errors, loss, corruption, etc., using various methods, techniques, functions, operations, actions, etc. In one embodiment, the controller 130 may protect the data by generating parity data (e.g., parity bits). The parity data may allow the controller 130 to determine whether there are errors in the data. (e.g., errors due to corruption, damaged cells, damaged blocks, error while reading the data, etc.). The parity data (e.g., one or more parity bits) may be generated using various algorithms, techniques, functions, operations, etc. In another embodiment, the controller 130 may use an ECC to generate codewords. The codewords may also allow the controller 130 (e.g., a decoder—not shown in the Figures) to correct or recover from errors in the codewords.

The controller 130 may also decode data that is stored on the non-volatile memory 140. In one embodiment, the decoder may decode codewords which encode the data that is stored on the non-volatile memory 140. In another embodiment, the decoder may perform error detection to determine the integrity of data retrieved from non-volatile memory 140 (e.g., to determine whether the data has errors). For example, the decoder may use parity data to cheek the data to determine whether there is an error in the data (e.g., whether one or more bits in the data, are incorrect due to corruption, damage cells, damaged blocks, etc.).

Controller 130 may determine whether data to be written to non-volatile memory 140 is to be deduplicated using inline deduplication using status information of the controller 130 as well as media characteristics in information of the non-volatile memory 140. Inline deduplication refers to deduplication of data that is performed as that data is being written to memory. Control processor 137 may retrieve status information about the controller 130 such as control processor utilization, temperature data, bandwidth, number of input/output operations per second, latency, buffer utilization, and pre-fetch status of the controller 130. Control processor 137 may also retrieve media characteristics of the non-volatile memory 140 such as latency and residual bit error rate (RBER) among others. Control processor 137 may determine whether the data to be written should be deduplicated based on the status information of the controller 130 as well as the media characteristics of the non-volatile memory 140. For example, controller 130 may determine that there is a high number of input/output operations per second, low bandwidth, and high latency and high processor utilization. This may indicate high levels of resource contention between deduplication and other controller functions, and thus control processor 137 may determine that inline deduplication should not be performed. This is because other controller functions such as data prefetching, data buffering, and other input output operations are all contending for the resources of control processor 137. Control processor 137 may also determine that the latency and RBER of the non-volatile memory 140 are high. As a result, control processor 137 may determine that the time saved avoiding writing duplicate data would be less than the time used for identifying and managing duplicate data and thus may determine that inline deduplication should not be performed so as to utilize the resources of control processor 137 for other functions.

In addition, if the control processor 137 determines that the controller 130 is in an idle status, it may determine not to perform inline deduplication. In another example, if the control processor 137 determines that the temperature of controller 130 is too high, then control processor 137 may decide not to perform inline deduplication. The control processor 137 may utilize a machine learning algorithm (e.g., via execution of deduplication decision module 135A) to make deduplication decisions based on status information and media characteristics. In some embodiments, the deduplication decision module 135A may include a set of decision making rules, such as if/else rules that govern the decision making process.

It is noted that while FIG. 1A depicts a single data storage device, the controller 130 could be implemented within a control unit or controller of a storage array or system, in which case, the functionalities described in the various embodiments would control data written to individual data storage devices of the storage array or system.

Figure 1B:
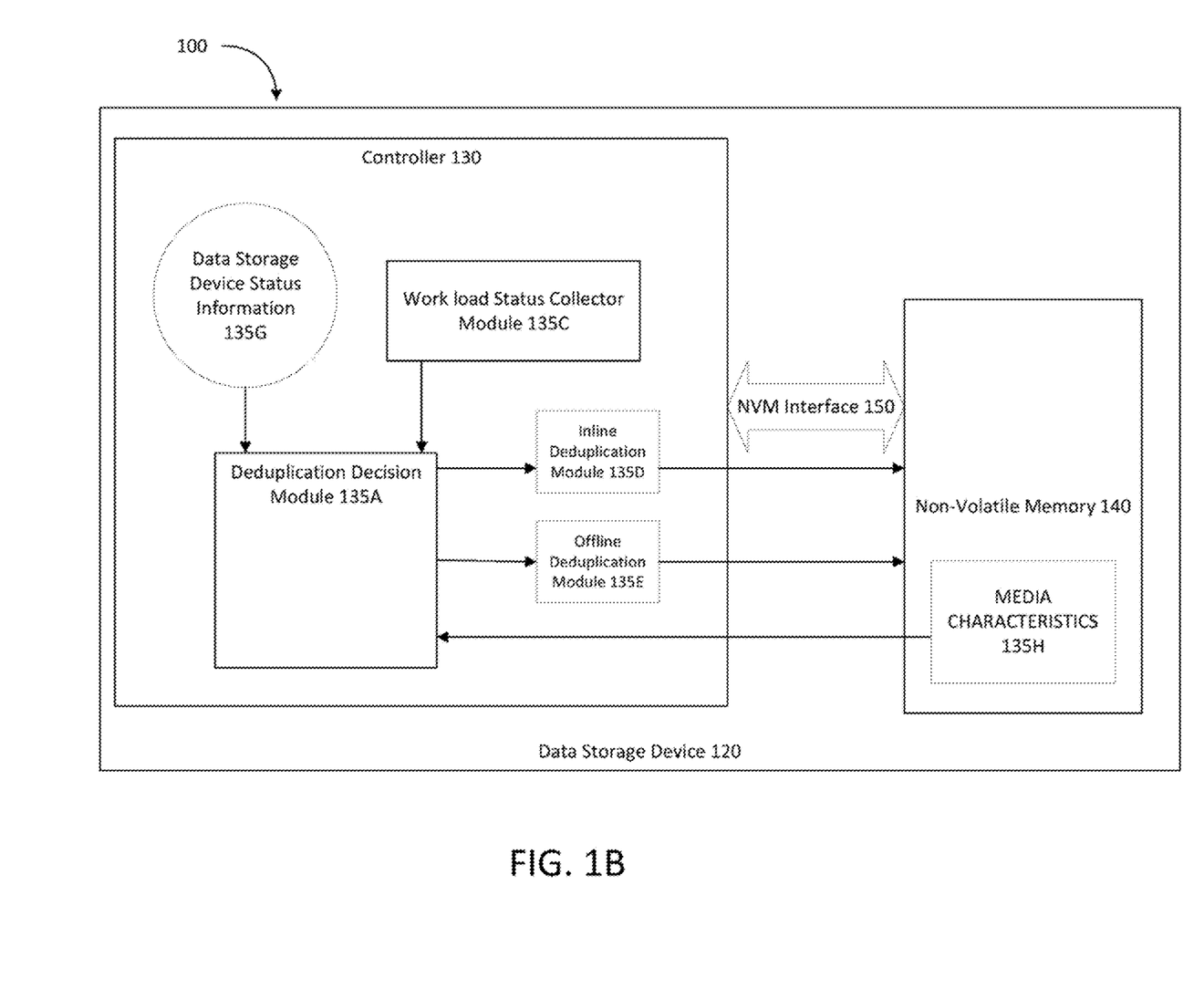
FIG. 1B is a block diagram illustrating the software modules and the data they are processing in the example data storage system of FIG. 1A, in accordance with some embodiments of the present disclosure.

FIG. 1B is a block diagram illustrating the exchange of data between the software modules in controller 130 of FIG. 1A, in accordance with some embodiments of the present disclosure. Controller 130 may include the deduplication decision maker 135A (discussed further herein), the work load status collector module 135C, the inline deduplication module 135D and the offline deduplication module 135E. Each software module may be stored in the memory device 135 and executed by control processor 137 (or otherwise implemented as discussed above) to perform the functions described with respect FIGS. 2,3 and 4 for example.

Deduplication decision module 135A may retrieve data storage device status information from the control processor 137 and media characteristics from non-volatile memory 140 and determine whether to perform inline or offline deduplication based on the data storage device status information 1350 and media characteristics 135H as discussed in further detail herein. In some embodiments, deduplication decision module 135A may determine whether to perform inline or offline deduplication further based on work load status information (as discussed further herein) of the data to be written, provided by work load status collector module 135C. If deduplication decision module 135A determines that inline deduplication should be performed for data being written, then inline deduplication module 135D may be executed. If deduplication decision module 135A determines that offline deduplication should be performed, then offline deduplication module 135E may be executed.

Figure 1C:
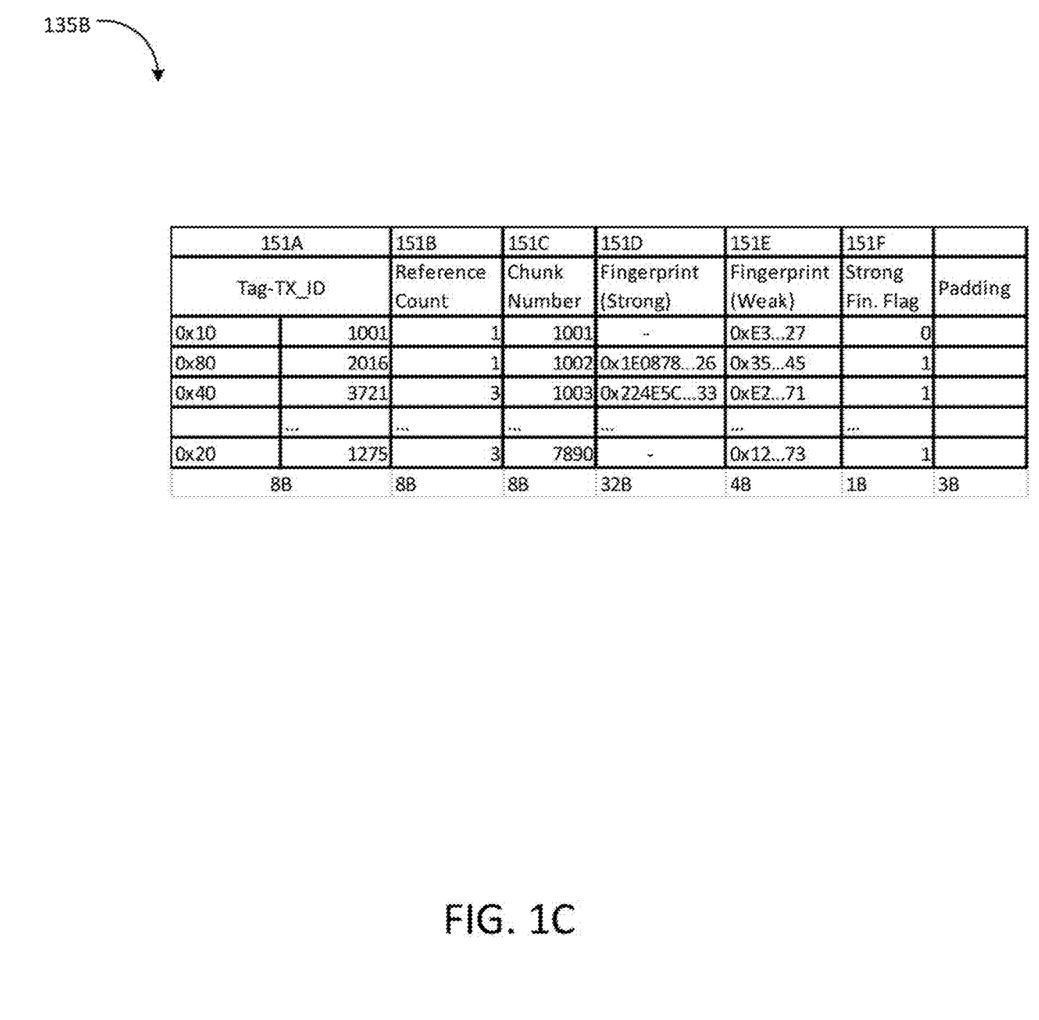
FIG. 1C is a diagram illustrating a metadata table, in accordance with some embodiments of the present disclosure.

FIG. 1C is a diagram of a metadata table 135B, illustrated in FIG. 1A, according to one embodiment. In some embodiments, an entry of the metadata table has the same size as a cache line of control processor 137. The first field 151A of an entry has a tag and an ID of a deduplication transaction consisting of 8 bytes (denoted 8B). Field 151A provides a consistent way to reference a particular entry of metadata table 135B. The second field 151B is the reference count to indicate the number of references on a data chunk (i.e. the number of times data to be written has matched that data chunk). The third field 151C is the chunk number. Note that each of the fields 151A-C can be updated using an 8 byte atomic write. The fourth and fifth fields 151D and 151E store strong and weak fingerprints, respectively, for a data chunk, 32 bytes are sufficient for common strong cryptographic hash (fingerprinting) functions, such as MD5 (16 B), SHA-1 (20 B), and SHA-256 (32 B) while 4 bytes are used for weak fingerprinting functions such as CRC32 or Fletcher-32. The sixth field 151F is a 1 byte flag to indicate whether the strong fingerprint is valid or not. The use of strong and weak fingerprints for a chunk allows for adaptive fingerprinting, as discussed herein. The last 3 bytes are padding bytes so that an entry has the same size as a cache line of control processor 137. Metadata table 135B jointly stores fingerprints, reference counts, and chunk numbers into one entry for a data chunk, which benefit both performance and consistency. Since metadata attributes of a chunk are likely to be successively used, fitting them into one cache line helps the control processor 137 to load them together and also eases the preservation of consistency.

FIG. 2 is a flowchart illustrating an example method 200 for determining whether data should be deduplicated in the data storage system 100 when non-volatile memory 140 comprises a memory having an access time for a chunk (or other unit) of data that may be greater than the time required to calculate a fingerprint for the same chunk of data. Non-volatile memory 140 may be for example, NAND flash memory. The method 200 may be performed by a processing device (e.g., a processor, a central processing unit (CPU), a controller, an application-specific integrated circuit (ASIC), a field programmable gate array (FPGA), etc.), a neural network, etc. For example, the method 200 may be performed by a processing device of a computing device, such as control processor 137. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

At block 205, control processor 137 may determine whether data to be written to non-volatile memory 140 is to be deduplicated using inline deduplication. Control processor 137 may retrieve status information about the controller 130 such as control processor utilization, temperature data, bandwidth, input/output operations per second (lops), latency, buffer utilization, and pre-fetch status of the controller 130. Control processor 137 may also retrieve media characteristics of the non-volatile memory 140 such as latency and residual bit error rate (RBER) among others. As discussed herein, control processor 137 may determine whether the data to be written should be deduplicated based on the status information of the controller 130 as well as the media characteristics of the non-volatile memory 140. For example, when the controller 130 experiences high levels of resource contention between deduplication and other operations, it may determine not to perform inline deduplication as discussed herein. In some embodiments, control processor 137 may determine whether data to be written to non-volatile memory 140 should be deduplicated further based on the work load status of the data to be written. For example, control processor 137 may consider whether the data is update, write, and/or read intensive based on the size, frequency and other characteristics of the data. Such work load status information may be collected and provided by work load status collector module 135C (as discussed above with respect to FIG. 1B).

At block 210, upon determining that the data to be written should not be deduplicated, control processor 137 may write the data to non-volatile memory 140. In some embodiments, control processor 137 may proceed to block 270 and perform offline deduplication of the data (i.e., performing deduplication after the data has been written). Offline deduplication may be performed in the same manner as inline deduplication discussed herein. At block 215, in response to determining that the data to be written should be deduplicated, control processor 137 may determine a workload deduplication ratio of the data to be written and compare it to a threshold workload deduplication ratio. Control processor 137 may determine the threshold workload deduplication ratio based on factors including the average time to write a chunk of data, average time to calculate a strong fingerprint for a chunk of data, average time to calculate a weak fingerprint for a chunk of data, and the average time to search for a fingerprint in a metadata table. Control processor 137 may determine the workload deduplication ratio for the data using a workload monitor software module (not shown in the Figures) implementing methods such as periodical sampling.

At block 220, in response to determining that the workload deduplication ratio of the data to be written is above or equal to the threshold, control processor 137 may calculate a strong fingerprint for the data. Control processor may utilize any appropriate strong fingerprinting algorithm such as SHA-1 or SHA-256 to generate a strong fingerprint for the data. At block 225 control processor 137 may compare the strong fingerprint to each strong fingerprint value in a fingerprint metadata table (e.g., metadata table 135B) and determine whether the strong fingerprint matches any values in the metadata table. If there is a match, then at block 230 control processor 137 may determine that the data to be written is duplicative of existing data stored in non-volatile memory 140 and update a logical to physical mapping (L2P) table. More specifically, control processor 137 may update the L2P table to indicate that the logical location of the data to be written corresponds to the physical location of the existing data already stored in non-volatile memory 140. Stated differently, the data to be written already exists at the physical address in non-volatile memory 140 of the existing data already stored in non-volatile memory 140. If there is no match (i.e. data to be written is not duplicative), then control processor 137 proceeds to block 210 where it may write the data to the non-volatile memory 140.

At block 235, in response to determining that the workload deduplication ratio of the data to be written is below the threshold, control processor 137 may calculate a weak fingerprint for the data. Control processor 137 may utilize any appropriate algorithm, such as CRC32 or Fletcher32 to calculate the weak fingerprint. Because calculating a strong fingerprint value is a computationally intensive and high latency operation, control processor 137 may first calculate a weak fingerprint before determining whether it is necessary to spend the resources computing a strong fingerprint. At block 240, control processor 137 may compare the weak fingerprint value to each value in the metadata table. In response to determining that there is no matching value in the metadata table for the weak fingerprint, control processor 137 may proceed to block 210 where control processor 137 may write the data to the non-volatile memory 140. If the weak fingerprint value does match any of the values in the metadata table (indicating that there is a sufficient but not definite possibility that the data is duplicative), then at block 245 control processor 137 may calculate a strong fingerprint for the data as discussed above with respect to block 220. At block 250 control processor 137 may compare the strong fingerprint value to each value in the metadata table and determine whether the strong fingerprint matches any values in the metadata table. If there is a match, then control processor 137 may proceed to block 230 where it may update the L2P table as discussed above. If there is no match, then control processor 137 proceeds to block 210 where it may write the data to the non-volatile memory 140.

FIG. 3 is a flowchart illustrating an example method 300 for determining whether data should be deduplicated in the data storage system 100 when non-volatile memory 140 comprises a memory having an access time for a chunk (or other unit) of data that may be less than die time required to calculate a fingerprint for the same chunk of data. The method 300 may be performed by a processing device (e.g., a processor, a central processing unit (CPU), a controller, an application-specific integrated circuit (ASIC), a field programmable gate array (FPGA), etc.), a neural network, etc. For example, the method 300 may be performed by a processing device of a computing device, such as control processor 137. The controller, processing device and/or neural network may be processing logic that includes hardware (e.g., circuitry, dedicated logic, programmable logic, microcode, etc.), software (e.g., instructions run on a processor to perform hardware simulation), firmware, or a combination thereof.

At block 305, control processor 137 may determine whether data to be written to non-volatile memory 140 is to be deduplicated using inline deduplication as discussed above with respect to FIGS. 1A and 2. Control processor 137 may retrieve status information about the controller 130 as well as media characteristics of the non-volatile memory 140 and determine whether the data to be written should be deduplicated based on the status information of the controller 130 as well as the media characteristics of the non-volatile memory 140. In some embodiments, control processor 137 may determine whether data to be written to non-volatile memory 140 should be deduplicated further based on the work load status of the data to be written. For example, control processor 137 may consider whether the data is update, write, and/or read intensive based on the size, frequency and other characteristics of the data.

At block 310, upon determining that the data to be written should not be deduplicated, control processor 137 may write the data to non-volatile memory 140. In some embodiments, control processor 137 may proceed to block 370 and perform offline deduplication of the data. At block 315, in response to determining that the data to be written should be deduplicated, control processor 137 may calculate a weak fingerprint for the data. Control processor 137 may utilize any appropriate algorithm, such as CRC32 or Fletcher32 to calculate the weak fingerprint. At block 320, control processor 137 may compare the weak fingerprint value to each value in the metadata table. At block 325, in response to the weak fingerprint value matching any of the values in the metadata table, control processor 137 may read data from the non-volatile memory 140 and at block 330 may compare the read data with the data to be written. Because calculating a strong fingerprint value is a computationally intensive and high latency operation, when non-volatile memory 140 comprises a memory having access time liar a unit of data that may be less than the time required to calculate a fingerprint for the same unit of data, control processor 137 may read the contents of non-volatile memory 140 and directly compare the data to be written to the contents read out of non-volatile memory 140 to determine if the data to be written is duplicative. At block 335, if the data to be written matches any of the data read from non-volatile memory 140, then control processor 137 may update the L2P table as discussed above with respect to FIG. 2. If at block 330 the data to be written does not match any of the data read from the non-volatile memory 140, then method 300 may proceed to block 310 where control processor 137 may write the data to non-volatile memory 140.

FIG. 4 is a flowchart illustrating an example method 400 for determining whether data should be deduplicated in the data storage system 100 when non-volatile memory 140 comprises a first memory comprising a memory having an access time for a chunk (or other unit) of data that may be greater than the time required to calculate a fingerprint for the same chunk of data (e.g., NAND flash) and a second memory comprising a memory having an access time for a chunk (or other unit) of data that may be less than the time required to calculate a fingerprint for the same chunk of data (e.g., fast NAND flash or SCM). The method 400 may be performed by a processing device (e.g., a processor, a central processing unit (CPU), a controller, an application-specific integrated circuit (ASIC), a Field programmable gate array (FPGA), etc.), a neural network, etc. For example, the method 400 may be performed by a processing device of a computing device such as control processor 137. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

Figure 5:
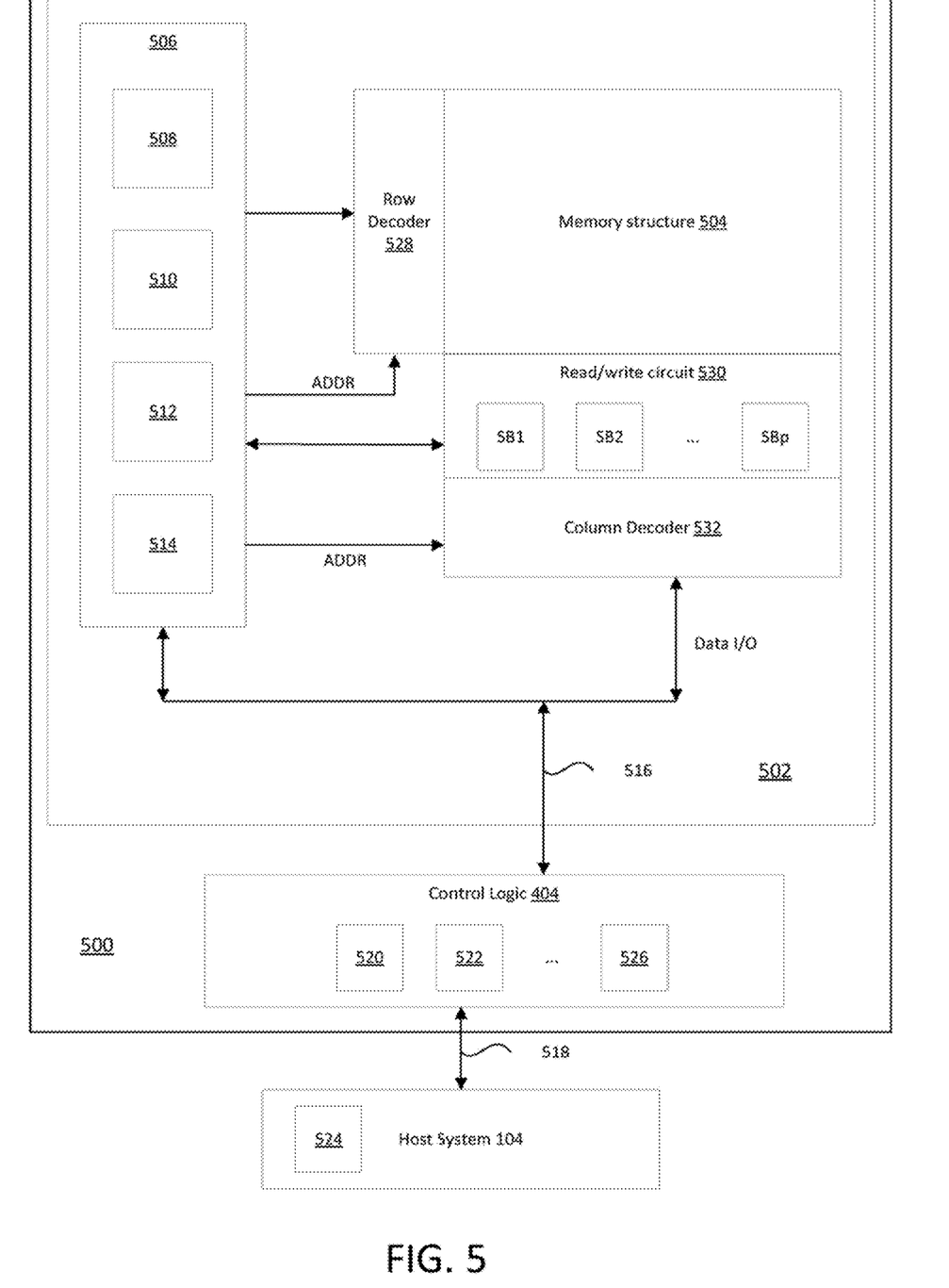
FIG. 5 is a block diagram of a non-volatile data storage system, in accordance with one or more embodiments of the present disclosure.

At block 405, control processor 137 may determine whether data to be written is to be written to the first memory or the second memory of non-volatile memory 140. If control processor 137 determines that the data is to be written to the second memory, then control processor 137 may proceed to block 305 of method 300, if control processor 137 determines that the data is to be written to the first memory, then control processor 137 may proceed to block 205 of method 200, FIG. 5 is a block diagram of an exemplary non-volatile data storage system 500, which may be similar to data storage system 100 illustrated in FIG. 1. The non-volatile data storage system 500 may include one or more memory die 502. The memory die 502 includes a memory structure 504 of memory cells, such as an array of memory cells herein referred to as a memory array, address controller 506 and read/write circuits 530. The memory structure 504 is addressable by word lines via a row decoder 528 and by bit lines via a column decoder 532. The read/write circuits 530 include multiple sense blocks SB1, SB2, . . . , SBp (sensing circuitry) and allow a page of memory cells to be read or programmed in parallel. Typically the memory system-based control logic 404 is included in the same non-volatile memory system 500 (e.g., a removable storage card) as the one or more memory die 502. Control commands and data (e.g., a raw video stream) are transferred between the host system 104 and memory system-based control logic 404 via a data bus 518, and between the controller and the one or more memory die 502 via lines 516. The data bus 518 may for example be a PCIe serial memory bus.

The memory structure 504 can be 2D (laid out in a single fabrication plane) or 3D (laid out in multiple fabrication planes). The memory structure 504 may comprise one or more array of memory cells including a 3D array. In one embodiment, the memory structure 504 may comprise a monolithic three-dimensional memory structure (3D array) in which multiple memory levels are conned above (and not in) a single substrate, such as a wafer, with no intervening substrates. The memory structure 504 may comprise any type of non-volatile memory that is monolithically formed in one or more physical levels of arrays of memory cells having an active area disposed above a silicon substrate. The memory structure 504 may be in a non-volatile memory device (e.g., non-volatile data storage system 500) having circuitry associated with the operation of the memory cells, whether the associated circuitry is above or within the substrate.

The address controller 506 cooperates with the read/write circuits 530 to perform memory operations on memory cells of the memory structure 504, and includes a state machine 508, an address decoder 510, and a power control 514. The state machine 508 provides control of memory operations. A store region selector 512 may be provided, e.g., for programming parameters as described further below.

The address decoder 510 provides an address interface between that used by the host or a memory system-based control logic 404 to the hardware address used by the row decoder 528 and column decoder 532. The power control 514 controls the power and voltages supplied to the various control lines during memory operations. The power control 514 and/or read/write circuits 530 can include drivers for word lines, source gate select (SOS) transistors, drain gate select (DOS) transistors, bit lines, substrates (in 2D memory structures), charge pumps, and source lines. The sense blocks can include bit line drivers and sense amplifiers in one approach.

An SOS transistor is a select gate transistor at a source end of a memory string, and a DOS transistor is a select gate transistor at a drain end of a memory string.

In some implementations, some of the components can be combined. In various designs, one or more of the components (alone or in combination), other than memory structure 504, can be thought of as at least one control circuit or controller which is configured to perform the techniques described herein. For example, a control circuit may include any one of, or a combination of, address controller 506, state machine 508, address decoder 510, column decoder 532, power control 514, control processor 526, sense blocks SB1, SB2, . . . , SBp, read write circuits 530, memory system-based control logic 404, and so forth.

The memory system-based control logic 404 may comprise a control processor 526 and memory devices such as controller read-only memory 520 and controller volatile memory 522.

The memory devices of the memory system-based control logic 404 may comprise code such as a set of instructions that configure the control processor 526 to execute the set of instructions to provide aspects of the functionality described herein. Alternatively or additionally, the control processor 526 can access code from the memory structure 504, such as a reserved area of memory cells in one or more word lines.

For example, code can be used by the memory system-based control logic 404 to access the memory structure 504, controller read-only memory 520, or controller volatile memory 522 for partial decoding and/or event detection logic. In some embodiments the control logic may utilize the host system volatile memory 524 for caching some or all of the raw video stream for partial decoding and event detection, using for example direct memory access technology (DMA) over the data bus 518. The control logic may further include drivers to perform basic tasks such as controlling and allocating memory, prioritizing the processing of instructions, and controlling input and output ports.

Generally, the control logic can include software and other logic. (e.g., circuits, firmware) to perform the functions described herein. The control logic may comprise a sequencer to control the timing (start and stop times, durations, spacing etc.) of the various signals described herein. The state machine 508 may also be utilized to implement aspects of the control logic.

In one embodiment, the host system 104 is a computing device e.g., laptop, desktop, smartphone, tablet, digital camera) that includes one or more processors, one or more processor readable storage devices (host system volatile memory 524, ROM, flash memory, hard disk drive, solid state memory) that store processor readable code (e.g., software) for programming the one or more processors to perform aspects of the techniques described herein. The host system 104 may also include additional system memory, one or more input/output interfaces and/or one or more input/output devices in communication with the one or more processors, as well as other components well known in the art.

The store region selector 512 may be a non-volatile memory such as NAND flash memory, or another type. The store region selector 512 identifies blocks of the memory structure 504 for reading and writing, among other things, as known in the art.

One of skill in the art will recognize that the non-volatile memory system 500 is an example and that various implementations will include additional components, or exclude or combine some of the illustrated components, in manners known in the art.

General Comments

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An apparatus comprising:
   a memory; and
   a controller configured to:
   determine whether data to be written to the memory should be deduplicated based, at least in part, on status information of the controller and media characteristics of the memory, wherein the status information of the controller indicates a level of resources available for a deduplication operation; and
   in response to determining that the data should be deduplicated, determine whether the data is duplicative.

2. The apparatus of claim 1, wherein to determine whether the data is duplicative, the controller is further configured to:
   calculate a fingerprint for the data based, at least in part, on a type of the memory;
   compare the fingerprint to values in a metadata table; and
   further determine whether the data is duplicative responsive to the fingerprint matching a value in the metadata table.

3. The apparatus of claim 2, wherein the controller is further configured to write the data to the memory responsive to the fingerprint not matching any values in the metadata table.

4. The apparatus of claim 2, wherein the memory has an access time for a unit of data that is less than the time required to calculate a fingerprint for the unit of data, and wherein to calculate the fingerprint for the data, the controller is further configured to calculate a weak fingerprint for the data.

5. The apparatus of claim 4, wherein to further determine whether the data is duplicative, the controller is further configured to:
compare the data to stored data from the memory;
responsive to determining that the data matches any of the stored data, update a logical to physical table with the weak fingerprint for the data; and
responsive to determining that the data does not match any of the stored data, write the data to the memory.

6. The apparatus of claim 2, wherein the memory has an access time for a unit of data that is greater than the time required to calculate a fingerprint for the unit of data, and wherein to calculate the fingerprint for the data, the controller is further configured to:
calculate a strong fingerprint when a workload deduplication ratio is above or equal to a threshold; and
calculate a weak fingerprint when the workload deduplication ratio is below the threshold.

7. The apparatus of claim 6, wherein the workload deduplication ratio is below the threshold and wherein to further determine whether the data is duplicative, the controller is further configured to:
calculate a second strong fingerprint;
compare the second strong fingerprint to the values in the metadata table;
update a logical to physical table based on the strong fingerprint if the second strong fingerprint matches any of the values in the metadata table; and
write the data to the memory if the second strong, fingerprint does not match any of the values in the metadata table.

8. The apparatus of claim 1, wherein the status information of the controller comprises CPU utilization, temperature data, bandwidth, number of input/output operations per second, latency, buffer utilization, and pre-fetch status of the controller.

9. The apparatus of claim 1, wherein the media characteristics of the memory comprise a latency and a residual bit error rate (RBER) of the memory.

10. The apparatus of claim 1, wherein the controller is further configured to: in response to determining; that the data should not be deduplicated, write the data to the memory.

11. The apparatus of claim 1, wherein the controller is further configured to determine whether the data should be deduplicated based, further in part, on a workload status of the data to be written.

12. The apparatus of claim 1, wherein the controller is further configured to utilize a machine learning algorithm to determine whether the data to be written to the memory should be deduplicated.

13. An apparatus comprising:
a memory including a first memory having an access time for a unit of data that is greater than the time required to calculate a fingerprint for the unit of data, and a second memory having an access time for a unit of data that is less than the time required to calculate a fingerprint for the unit of data; and
a controller configured to:
determine whether data to be written to the memory should be deduplicated based, at least in part, on status information of the controller and media characteristics of the memory, wherein the status information of the controller indicates a level of resources available for a deduplication operation; and
in response to determining that the data should be deduplicated, determine whether the data is duplicative based on whether the data to be written to the memory is to be written to the first memory or the second memory.

14. The apparatus of claim 13, wherein to determine whether the data is duplicative, the controller is further configured to:
calculate a fingerprint for the data based, at least in part, on a type of the memory;
compare the fingerprint to values in a metadata table; and
further determine whether the data is duplicative responsive to the fingerprint matching a value in the metadata table.

15. The apparatus of claim 13, wherein the status information of the controller comprises CPU utilization, temperature data, bandwidth, number of input/output operations per second, latency, buffer utilization, and pre-fetch status of the controller.

16. The apparatus of claim 13, wherein the media characteristics of the memory comprise a latency and a residual bit error rate (RBER) of the memory.

17. A method comprising:
determining whether data to be written to a memory should be deduplicated based, at least in part, on status information of a controller and media characteristics of the memory, wherein the status information of the controller indicates a level of resources available for a reduplication operation; and
in response to determining that the data should be deduplicated, determining whether the data is duplicative.

18. The method of claim 17, wherein determining whether the data is duplicative comprises:
calculating a fingerprint for the data based, at least in part, on a type of the memory;
comparing the fingerprint to values in a metadata table; and
further determining whether the data is duplicative responsive to the fingerprint matching a value in the metadata table.

19. The method of claim 18, wherein the status information of the controller comprises CPU utilization, temperature data, bandwidth, number of input/output operations per second, latency, utilization, and pre-fetch status of the controller.

20. The method of claim 18, wherein the media characteristics of the memory comprise a latency and a residual bit error rate (RBER) of the memory.

* * * * *